Patented Feb. 8, 1944

2,341,140

UNITED STATES PATENT OFFICE 2,341,140

STABILIZATION OF UNSATURATED HALIDES

William Engs, Piedmont, Calif., assignor to Shell Development Company, San Francisco, Calif., a corporation of Delaware No Drawing. Application November 28, 1940, Serial No. 367,570

10 Claims. (Cl. 226—19)

This invention relates to the stabilization and preservation of unsaturated organic halides, and more particularly pertains to the preservation of unsaturated halides under ordinary storage and/or transportation conditions. In one of its specific embodiments, the invention covers a novel process of stabilizing allyl type halides, and particularly allyl type chlorides, which normally tend to deteriorate under storage and transportation conditions, particularly when such storage and/or shipping is effected in ferruginous containers. The invention also includes a novel method of storing or packaging halogenated unsaturated organic compounds, as well as the package thus produced.

Although the present invention is adapted to the preservation of all unsaturated organic halides, it is particularly applicable to "allyl type halides" which are unsaturated hydrocarbons containing an ethylenic linkage and a halogen atom on a carbon atom in allyl position with respect to the double bond. The following is a representative list of allyl type halides to which the process of this invention is applicable: the allyl halides, the methallyl halides, 1-halobutene-2, 3-halobutene-1, 1-halo-3-methyl butene-2, 2-halopentene-3, and the like, and their homologues and analogues, as well as suitable substitution products.

The above-defined unsaturated organic halides, and especially the allyl type monochlorides, are very valuable chemical compounds and find particular utility as intermediates in the production of a wide variety of different and useful products. For example, allyl and methallyl chlorides are employed in the production of the corresponding unsaturated alcohols. Also, allyl chloride is an intermediate for the manufacture of allyl thiocyanate as well as of various valuable glycerin derivatives. Similarly, the other unsaturated organic halides are employed to produce unsaturated alcohols, halohydrins, epoxides, and many other useful and valuable chemicals. In most cases, and particularly when the unsaturated halides are employed as intermediates, it is desirable to have the unsaturated halides in an extremely pure state. While the original state of purity of the halides of the defined class may be adequately controlled during the manufacture thereof, it is quite often exceedingly difficult, and frequently impossible, to maintain this purity during storage and/or shipping. This is in part due to the fact that by nature these halides, and particularly the above-defined allyl type halides, such as the allyl type chlorides, bromides, etc., have a tendency to deteriorate upon standing in ordinary storage containers, such deterioration resulting in the formation of impurities the removal of which is frequently difficult. To a certain degree this deterioration may be inhibited or controlled by proper selection of the container material. For example, glass, which is generally and universally employed where extreme purity of a liquid is to be preserved, may be used as a material for the construction or lining of containers employed for the storage or shipment of the defined class of unsaturated halides. However, where large volumes of the material are to be handled, it is generally impractical to employ glass containers or even containers which are lined with glass, and it is, therefore, the general practice to employ ferruginous containers, i. e., those made of iron or iron alloys. The unsaturated organic halides, and particularly the allyl type halides, such as allyl chloride, methallyl chloride, and the like, as well as the corresponding bromides, when stored or shipped in such containers, are susceptible to the formation of an impurity which is readily noticeable by the development of a yellow-to-amber color. Although various attempts have been made to prevent or at least retard such impurity formation, it was found that the methods provided are ineffectual, prohibitively costly and/or have resulted in the formation of halide-containing mixtures which, although colorless, are unsuitable as intermediates in many preparations due to the presence of compounds added as discoloration inhibitors. Also, some inhibitor compounds are unsuitable because they impart an undesirable color to the halides.

It is, therefore, an object of the present invention to provide an improvement in the stabilization or preservation of the unsaturated halides, and also to provide means for preventing color formation in these halides when stored in containers of iron or iron-containing materials, or the like.

It has now been discovered that the above and other objects may be attained by the addition of water to the unsaturated organic halide, the water acting as an effective preserving agent. It was further discovered that unsaturated organic halides which ordinarily become discolored when disposed in ferruginous containers, may be readily stored and/or shipped in such containers without any color formation, this stabilization or preservation of the halides being effected by adding small quantities of water to the unsaturated halide in the ferruginous containers. The quantity of water employed as the color preserving agent may vary within relatively wide limits. However, under normal conditions, very small amounts are sufficient to inhibit deterioration and discoloration of the unsaturated halides. For example, although the water may be employed in quantities as high as 5% to 10% by weight of the halide thus stored and/or shipped, it was found that excellent stabilizing results may be attained when its quantity is as low as 0.5% and even 0.1% by weight. The added water, particularly when employed in the preferred amounts specified above, is in no way detrimental to the adaptability of the stabilized unsaturated halides for most of their uses. At the same time, even when used in the small amounts defined above, the added water prevents the formation of the color-imparting deleterious impurities when the halides are stored or transported in ferruginous containers. Furthermore, the separation of water from the unsaturated halide stabilized thereby may be readily effected, for example, by decanting, it being known that most halides are substantially immiscible with water. As to the water dissolved in the halide, this may be separated by well known means, such as by ordinary fractional distillation, use of dessicating agents, and the like.

The tendency of the herein defined unsaturated organic halides to discolor and deteriorate appears to be aggravated by the presence of metallic halides and/or halogen acids. These impurities, and particularly the halogen acids, are often present in the commercially manufactured unsaturated organic halides, especially when they are produced by halo-substitution. For example, a preferred method of manufacturing methallyl chloride comprises the so-called low-temperature chlorination via substitution of isobutylene. This chlorination is effected substantially at room temperatures, i. e., at about 15° to 20° C., the reactor being continuously cooled to remove the heat of reaction. The methallyl chloride formed during such chlor-substitution is withdrawn from the reactor in a liquid state. This chloride contains some hydrogen chloride dissolved therein. Similarly, when secondary olefins are halogenated via substitution at elevated temperatures in accordance with the process disclosed and claimed in the Groll et al. U. S. Patent 2,130,084, the reaction product, upon liquefaction, will contain at least traces of dissolved halogen acid formed as a by-product of the halo-substitution reaction. Also, if effected in metal reactors, the reaction products resulting from such high-temperature halo-substitution reaction may contain some metal halide present therein. Although the addition of water according to the present process counteracts the deteriorating effects of the aforementioned and other impurities present in the unsaturated organic halides, and prevents an amber or brown coloration, such water addition will not eliminate entirely the yellow shades. Therefore, it is usually advantageous to subject the unsaturated organic halides to a preliminary purifying step before adding the aforementioned preserving agent. Depending on the nature and character of these impurities, satisfactory purification may be effected by fractional distillation with or without refluxing and at various pressures, and/or by neutralizing with alkali. When so purified, the unsaturated organic halides, and particularly the allyl type chlorides, may be stored for many months or shipped in ferruginous containers without deterioration and color formation if relatively small amounts of water are present in contact with such halides.

The following examples will serve to illustrate a preferred embodiment of the present invention as applied to the stabilization or preservation of allyl and methallyl chlorides, it being understood, however, that there is no intention of being limited by any specific conditions disclosed in the examples.

*Example I*

Propylene and chlorine, employed in a mol ratio of about 4:1, were commingled and reacted at a temperature of about 500° C. to 510° C., the residence time in the reactor being in the neighborhood of about one second. The reaction mixture thus formed was then cooled to between about 50° C. and 75° C., and scrubbed with water to remove most of the hydrogen chloride formed as a by-product during the chlor-substitution reaction. The remaining vapors were then fractionated by partial condensation, selective solvent extraction and fractional distillation to recover pure allyl chloride. About 400 pounds of allyl chloride thus produced were then introduced into an iron container, water being added in an amount equal to between about 0.25% and 0.30% by weight of the introduced allyl chloride. After prolonged storage under these conditions, and after a subsequent two-week transportation by rail, the material was still clear and colorless.

*Example II*

Allyl chloride which was prepared and purified in the manner described in the previous example, was stored in iron containers in the absence of any added water. The allyl chloride assumed a decidedly amber color within about two weeks. When subjected to distillation to recover pure allyl chloride, it was found that due to its deterioration during storage, there was a loss of a considerable portion of the original material.

*Example III*

Two samples of substantially pure methallyl chloride were placed in ferruginous containers. A small amount of water was added to one of these samples. After standing in the dark for about one month, the sample containing water showed no change in color, whereas the other sample was of a dark brown color.

A comparison of the above tests renders the advantages of the present invention quite evident. The water has a preserving effect even though the unsaturated halide is not previously purified. However, as previously noted, the preliminary treatment or purification is generally desirable to prevent any deterioration of the halide and the resultant color formation. Modifications in the purifying step or steps will depend in part on the character and nature of the material treated, and will be readily apparent to those skilled in the art.

Although the invention has been described in the above examples with particular reference to the preservation of allyl and methallyl chlorides, it is to be understood that other allyl type halides, such as allyl bromide, allyl iodide, methallyl bromide and the like, and, in fact, other unsaturated halides, which deteriorate and/or discolor upon storage and/or transportation in ferruginous containers, may be effectively preserved by addition of water according to the present invention.

I claim as my invention:

1. A process for preserving allyl chloride which tends to discolor when disposed in iron containers which comprises subjecting allyl chloride to a purifying treatment to separate any impurities present therein, introducing the purified allyl chloride into an iron container, and adding water in an amount equal to about 0.25% by weight of the allyl chloride.

2. A process for preserving allyl chloride which tends to deteriorate when disposed in ferruginous containers which comprises introducing allyl chloride into a ferruginous container and adding water in an amount equal to between about 0.1% and 10% by weight of the allyl chloride.

3. A process for preserving allyl halides which tend to deteriorate when disposed in ferruginous containers which comprises introducing an allyl halide into a ferruginous container and adding water to the allyl halide in an amount equal to between about 0.1% and 10% by weight of the allyl halide.

4. A process for preserving methallyl chloride which tends to deteriorate when disposed in ferruginous containers which comprises introducing methallyl chloride into a ferruginous container and adding water to said methallyl chloride in an amount equal to between about 0.1% and 10% by weight of the methallyl halide.

5. A process for preserving methallyl halides which tend to deteriorate when disposed in ferruginous containers which comprises introducing a methallyl halide into a ferruginous container and adding water to the methallyl halide in an amount equal to between about 0.1% and 10% by weight of the methallyl halide.

6. A process for preserving allyl type chlorides which tend to deteriorate when disposed in ferruginous containers which comprises introducing an allyl-type chloride into a ferruginous container and adding water thereinto in an amount between about 0.1% and 10% by weight of the allyl type chloride to be preserved.

7. A process for preserving an allyl type halide which tends to deteriorate when in ferruginous containers which comprises introducing an allyl type halide into a ferruginous container and adding water in an amount equal to between about 0.1% and 10% by weight of the halide to be preserved.

8. A packaged allyl halide comprising a ferruginous container having therein a substantially colorless allyl halide together with water in an amount equal to between about 0.1% and 10% by weight of the allyl halide.

9. A packaged methallyl halide comprising a ferruginous container having therein a substantially colorless methallyl halide together with water in an amount equal to between about 0.1% and 10% by weight of the methallyl halide.

10. A packaged allyl type halide comprising a ferruginous container having an allyl type halide therein together with water in an amount equal to between about 0.1% and 10% by weight of said allyl type halide.

WILLIAM ENGS.